Feb. 8, 1966 J. D. SERRA 3,233,289
APPARATUS FOR THE MANUFACTURE OF ELASTIC GIRDLES
Original Filed April 28, 1960 7 Sheets-Sheet 2

Feb. 8, 1966 J. D. SERRA 3,233,289
APPARATUS FOR THE MANUFACTURE OF ELASTIC GIRDLES
Original Filed April 28, 1960 7 Sheets-Sheet 5

Feb. 8, 1966    J. D. SERRA    3,233,289
APPARATUS FOR THE MANUFACTURE OF ELASTIC GIRDLES
Original Filed April 28, 1960    7 Sheets-Sheet 6

United States Patent Office 3,233,289
Patented Feb. 8, 1966

3,233,289
APPARATUS FOR THE MANUFACTURE OF ELASTIC GIRDLES
Juan Duarry Serra, Provenza St. 255, Barcelona, Spain
Original application Apr. 28, 1960, Ser. No. 25,427, now Patent No. 3,138,162, dated June 23, 1964. Divided and this application June 13, 1962, Ser. No. 210,867
Claims priority, application Spain, May 2, 1959, 73,766; 249,542; July 8, 1959, 250,860; Sept. 4, 1959, 75,901, 75,902
4 Claims. (Cl. 18—41)

This invention relates to apparatus for the manufacture of elastic girdles and has for an object the provision of apparatus for the manufacture of elastic seamless girdles of mesh-like body molded from deposited latex.

This application is a division of parent application, Serial No. 25,427, filed April 28, 1960, issued June 23, 1964 as U.S. Patent No. 3,138,162, directed to an elastic girdle made up of a single, seamless piece of deposited latex, which is characterized primarily by having on most of its surface a molded mesh-like network of multiple small holes, with the girdle having at the upper and lower edges continuous areas of reinforcement which form a unit with the mesh-like zone.

The mesh-like area between the upper and lower edges is provided with reinforcements of any predetermined pattern which form a unit with the mesh-like area. A girdle of this improved construction offers the important advantage over ordinary laminated rubber girdles that, because of its open-weave style mesh, created by multiple small holes, it permits the free breathing of the skin on which it is placed, completely preventing the accumulation of perspiration beneath it. Furthermore, the continuous reinforcements, appearing at the top and bottom of the garment and forming a unit with the mesh-like zone, reduce the elasticity of the girdle in these areas thereby assuring the proper fit of the girdle on the body. Additionally, the continuous reinforcements appearing in the mesh-like area between the upper and lower edges, and having any desired pattern, reduce the elasticity of the girdle in selected regions for suitable support of the abdomen, hips and the like.

Girdles of the foregoing type preferably are manufactured on novel inexpensive molds or mold assemblies comprising a thin frame or screen of mesh material corresponding to the shape of the girdle to be manufactured over a core or screen of continuous surface and slightly spaced from it. The thin screen or frame of mesh material is designed to support, during manufacture, the liquid material, such as latex, sprayed upon it for forming the girdle, and the core or baffle receives the material which during the atomization or pulverization of the spraying process passes through the holes of the frame. The frame may be made of any material having multiple small holes therethrough, for example metal screening, forming a hollow body of straight, curved or mixed outline as desired. Furthermore, the fine screen may have areas covered by a film of any suitable material firmly bonded to its meshes which determine corresponding continuous zones, forming smooth or raised designs in the finished girdle.

Another aspect of the invention is that two of the mesh-like screen frames may be placed together at a slight distance from each other and be fastened to a single core for the concurrent manufacture of two girdles.

In accordance with a further aspect of the invention there is provided a machine for the manufacture of elastic, seamless girdles by spraying liquid or powdered material on a mold and providing relative rotation between the mold and the spray. The machine is particularly suitable for manufacturing elastic girdles of the present invention, which on most of their surface present multiple small holes, by the employment of a mold made up of a hollow rounded body of any open weave or mesh such as a perforated plate or screen, and which carries inside a core or baffle of continuous surface of the type referred to above. The machine is characterized by including a carrying mechanism for the mold and corresponding core mounted in a housing containing an elongated opening. A heating unit and at least one spray nozzle are mounted facing the elongated opening and are adapted for alternating movement in a direction parallel to the mold for a distance corresponding to the length of the mold.

In accordance with a further aspect of the invention the carrier for the mold and its corresponding core is composed of a rotating platform powered by a suitable mechanism and the heating unit is located in a stationary position inside the housing opposite the elongated opening. In another form of the invention the carrier for the mold and its corresponding core comprises a stationary disc upon which is attached the core, the latter having a concave-convex body placed with the convex surface facing the elongated aperture of the housing. A rotating toothed wheel is concentric with the disc and carries the mold. The wheel is rotated from a suitable power source and a heating element is placed inside the core to dry the material deposited on the mold. The heating unit is preferably composed of electrical resistance or infrared tubes, although other suitable means may be used. The spraying means may be in the form of one or more nozzles mounted on a rotating column. The spraying means is connected with an oscillating device capable of imparting to the spraying nozzles during their alternating motion an oscillation perpendicular to the direction of their travel. The oscillating device may consist, for example, of an undulated guide parallel to the rotating column and a roller attached to the spraying means and adapted to roll on the guide.

For further objects and advantages of the invention, reference may be had to the following description taken in conjunction with the accompanying drawings in which.

Figure 1:
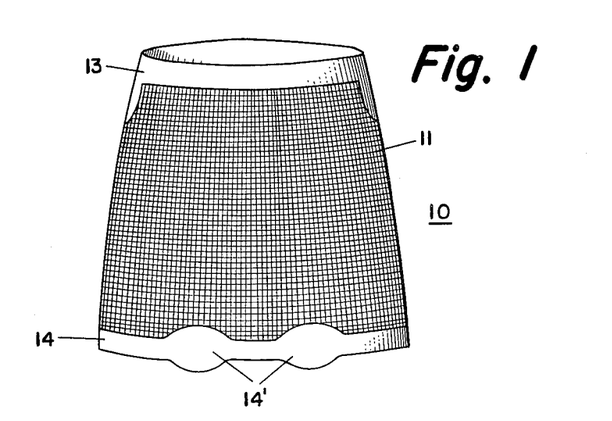
FIG. 1 is a perspective view of a girdle embodying the present invention.
Figure 2:
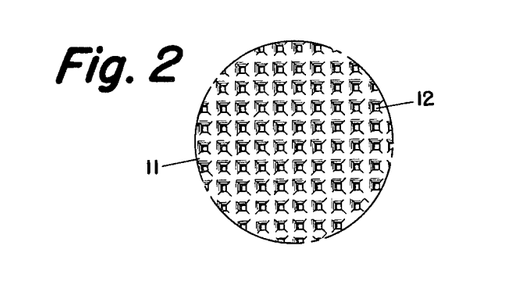
FIG. 2 is a fractional view, on enlarged scale, of an area of the girdle shown in FIG. 1 molded in mesh-like fashion.

Referring to FIGS. 1 and 2, there is illustrated a girdle 10 made up of a single, seamless piece of deposited latex having on the major portion of its surface a molded network 11 including multiple small molded holes 12. The holes 12 are maintained in the girdle material during the entire molding operation and are not subsequently introduced into the material as by mechanical perforating or by forcing gas through pores which have previously been bridged by rubber latex. The molded network 11 of FIG. 1 is in mesh style. The upper and lower parts of the girdle 10 are provided with reinforced continuous zones or areas 13 and 14 which form a single unit with the mesh or molded network 11. The upper reinforced zone 13 provides additional support for the body of the wearer, for example along the hips. The lower reinforcement 14 is provided, as shown, with enlarged portions 14' for fastening garters. The portions 14' may be reinforced with cloth if desired.

Figure 3:
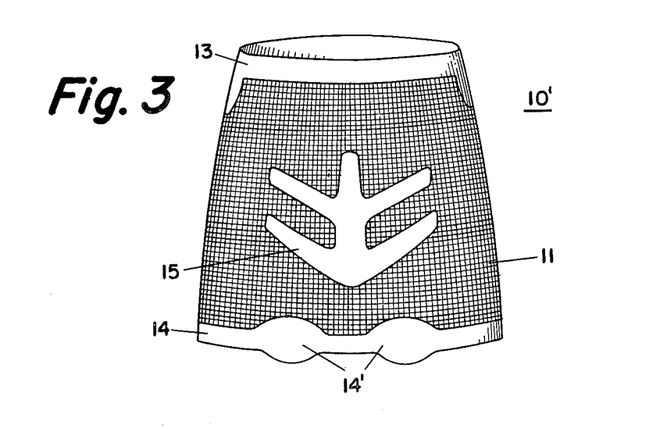
FIG. 3 is a perspective view similar to that of FIG. 1 showing the mesh-like area provided with a continuous reinforcement in the region of the abdomen.

In FIG. 3, which is a front view of a girdle 10' similar to that in FIG. 1, there is provided a continuous reinforcement portion 15 in the region of the abdomen which, like the reinforcements 13 and 14 at the top and bottom form a single integral unit with the entire mesh-like area 11.

Figure 5:
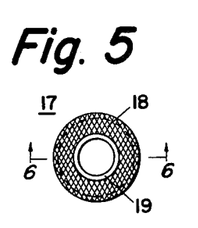
FIG. 5 is a top plan view of FIG. 4.
Figure 6:
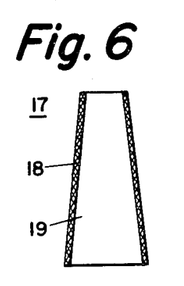
FIG. 6 is a vertical sectional view taken along the lines 6—6 in FIG. 5.
Figure 7:
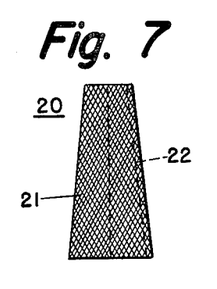
FIGS. 7–9 are views of a modification of the mold corresponding to FIGS. 4–6.
Figure 8:
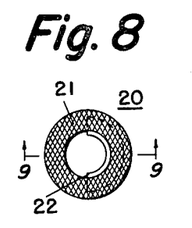
Figure 9:
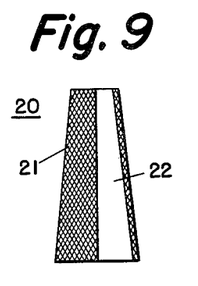

Girdles of the type embodying the present invention are adapted to be constructed on tubular-shaped molds such as illustrated in FIGS. 4–15. In general, each of the molds includes a frame in the form of a hollow tubular member having a fine network of holes which is placed over an interior core or baffle of imperforate material. In the form of mold 17, illustrated in FIGS. 4–6, there is provided a frame 18 having a fine network of holes, such as a metal screen in the shape of a hollow truncated cone. The frame 18 is placed on and at a slight distance from a core or baffle 19 comprising an inner hollow truncated core. In the modification of FIGS. 7–9 the mold 20 includes a frame 21 having a fine network of holes similar to frame 18. The frame 21 is placed over and slightly separated from a core or baffle 22 comprising a partial hollow truncated cone. The difference between the molds 17 and 20 will be hereinafter explained in connection with the description of the machine on which they are utilized in the manufacture of girdles shown in FIGS. 1–3.

Figure 10:
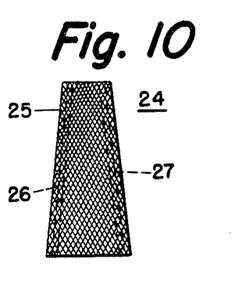
FIGS. 10–12 are views of another modification of the mold similar to FIGS. 4–6.
Figure 11:
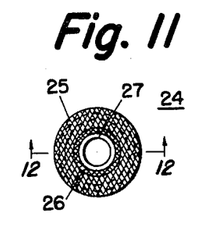
Figure 12:
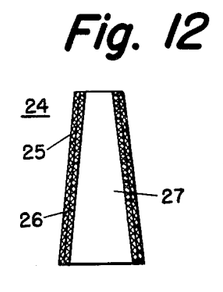

In FIGS. 10–12, the mold 24 comprises an outer frame 25 and an inner frame 26 similar to fraces 18 and 21. The frames 25 and 26 are juxtaposed at a slight distance from each other and are attached to a single core or baffle 27 comprised of a hollow truncated cone similar to core 19 of FIG. 4.

Figure 13:
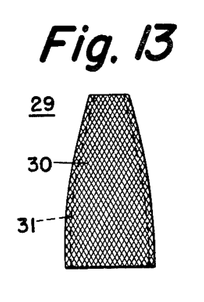
FIGS. 13 and 14 are side elevation views of additional modifications of the mold.
Figure 14:
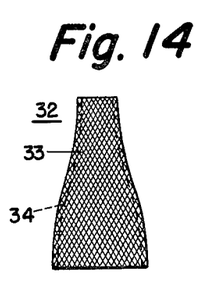

The molds 29 and 32 of FIGS. 13 and 14 likewise include respective frames 30 and 33 and their corresponding cores 31 and 34. The cores 31 and 34 may be continuous tubular members such as member 19 of FIG. 4 or sections of tubular members similar to core member 22 in FIG. 7. The molds 29 and 32 illustrated in FIGS. 13 and 14 show that the present invention is not limited to cone-shaped molds, but the invention is also applicable to molds having rounded hollow shapes of curved and sinuous appearance.

Figure 15:
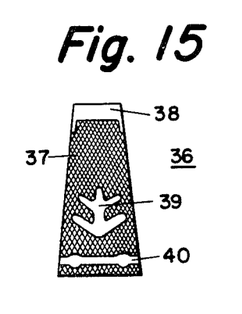
FIG. 15 is a further modification of the mold useful in the manufacture of a girdle of the type illustrated in FIG. 3.

In FIG. 15 there is illustrated a mold 36 having a frame 37 on which areas 38, 39 and 40 have been covered with a film of any suitable material, firmly attached to the mesh of the screen 37. The solid material areas 38–40 by their location determine corresponding continuous zones forming smooth or raised designs on the molded girdle as indicated in FIGS. 1 and 3.

The frames of the respective molds described above serve as a support during the manufacturing process for the liquid material; for example rubber latex, which is applied to the frames by atomization or pulverization. During this application of latex material, the frames are caused to rotate in front of spraying means including one or more nozzles. An example of a preferred form of machine is hereinafter described. The sprayed material is deposited on the various meshes of the frame in successive layers until reaching the desired thickness of the girdle, and by simultaneous heating, the drying and/or vulcanization of the girdle is produced with the finished girdle being easily removed from the mold or support. The latex material, which during atomization passes through the holes of the frame which forms the mold-support is deposited in a continuous coat on the core or baffle attached to the frame.

Figure 4:
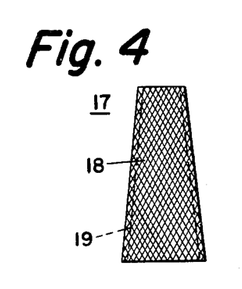
FIG. 4 is a side elevation view of a mold useful in the manufacture of girdles embodying the present invention as illustrated in FIGS. 1 and 2.

When the core is made of a closed rounded body as core 19 in the example of FIGS. 4–6, it may be stationary or turned with the corresponding frame 18. Where the frame is attached to a core made of a partial rounded body such as the core 22 in FIGS. 7–9, the core remains stationary while the frame is turning with the convex surface of the core facing the spraying device as later to be described in connection with FIGS. 19–22. Where the mold is provided with two frames fastened to a single core, such as mold 24 in FIGS. 10–12, two molded girdles are obtained simultaneously and at the same time there is a reduction in the amount of material deposited upon the core. It is of course to be understood that the deposit of material that forms on the core need not be discarded as waste, but may be used for the manufacture of garters or other items.

Figure 16:
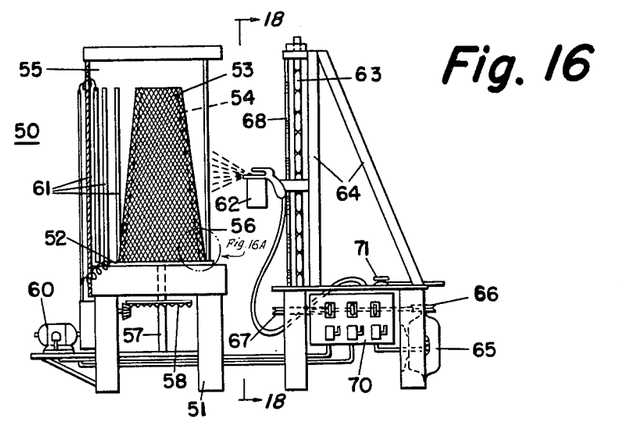
FIG. 16 is a side elevation of a machine for molding girdles in accordance with the present invention.
Figure 16A:
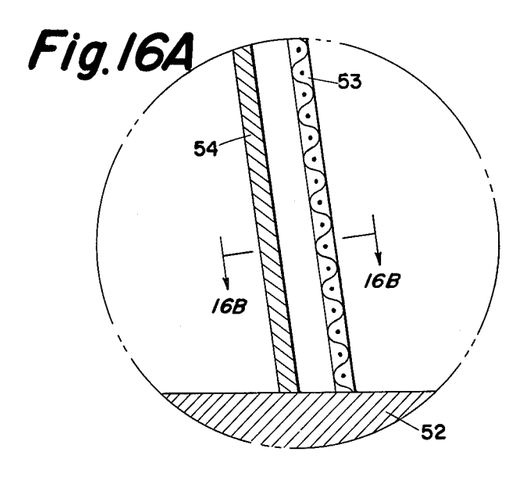
FIG. 16A is a fractional vertical sectional view on enlarged scale of the mold within the area of the circular outline identified by FIG. 16A in FIG. 16.
Figure 16B:
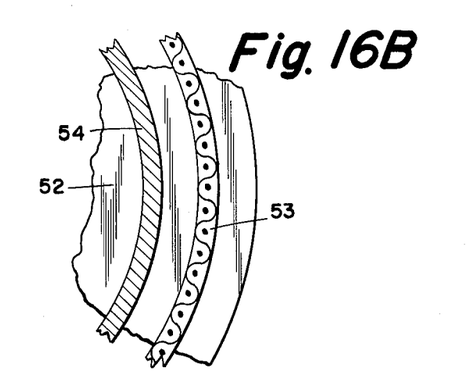
FIG. 16B is a plan view taken along the lines 16B—16B in FIG. 16A.
Figure 17:
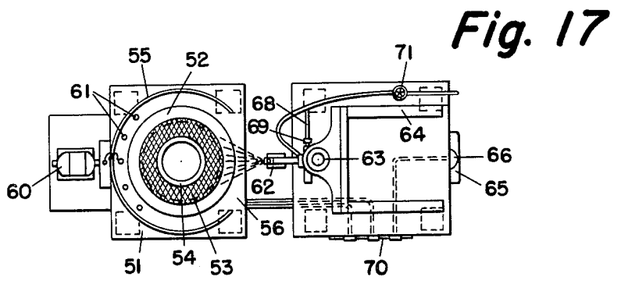
FIG. 17 is a bottom view of FIG. 16.
Figure 18:
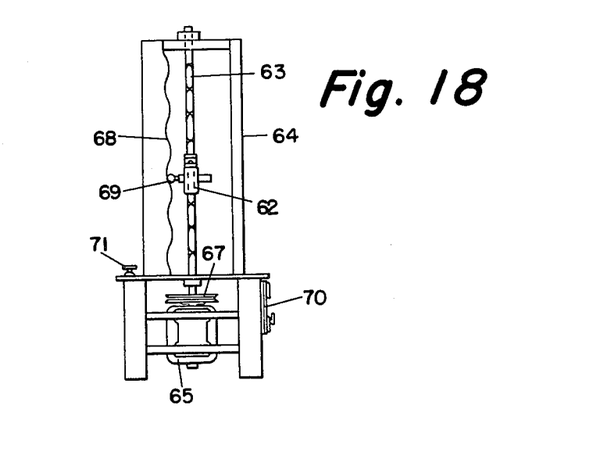
FIG. 18 is a fractional view taken in the direction of arrows 18 in FIG. 16.
Figure 19:
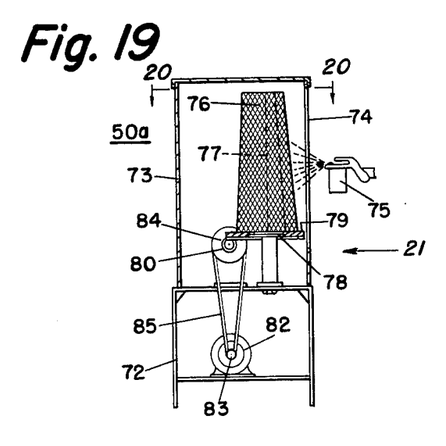
FIG. 19 is a fractional view of a modification of the machine of FIG. 16, partially illustrated in vertical section according to lines 19—19 of FIG. 20.

Referring to FIGS. 16–18, there is illustrated a machine 50 adapted to utilize molds such as illustrated in FIGS. 4–6 in the manufacture of girdies embodying the present invention. The machine 50 is provided with a base 51 on which is mounted a rotating platform 52 which serves as a carrier for the mold frame 53 and its corresponding core 54. The carrier 52, the mold frame 53 and the core 54 are all disposed within a housing 55 carried by the base 51, the housing having an elongated opening 56. The mold frame 53 consists of a hollow body in the form of a truncated cone made of a light network of any suitable material such, for example, as metal screening or a perforated metal plate having multiple small holes and the core or baffle 54 is in the shape of a hollow truncated cone having a continuous or imperforate surface. As may be seen in FIGS. 16A and 16B, the core or baffle 54 is mounted inside the frame 53 and spaced a slight distance from the inner surface of the perforated wall of the frame 53 to provide a void space therebetween. This is similar to the construction and spaced relation of the frames and cores previously described in connection with FIGS. 4–14. The rotating platform 52 is supported by an axle 57 to which is attached a gear wheel 58 which meshes with and is rotated by a corresponding pinion 59 driven from an electric motor 60. Within the housing 55 and opposite the elongated aperture 56 there is positioned a heating device 61. The heating device preferably is in the form of electric resistances or infrared tubes or their equivalent.

Outside of the housing 55 and facing the long opening 56 is a spraying means 62 comprising one or more nozzles mounted on a double-threaded rotating column 63. The column 63 is supported by a frame 64 and is driven from a motor 65 by way of pulleys 66 and 67 over which passes a V-belt. The drive motors 60 and 65 may be adjustable electric motors or they may be provided with automatic speed regulating means to permit adjustment of the rotational speed of the platform 52 and the double-threaded column 63. The column 63, during its rotation, imparts to the spraying device or nozzle 62 an alternating movement in a direction parallel to the mold 53 to an extent corresponding to the length of the mold. The pulverizing or atomizing nozzle 62 is equipped with an oscillating device capable of imparting to it during its alternating travel an oscillation movement perpendicular to the direction of its travel. In the example illustrated, the oscillation device comprises an undulated guide 68 mounted parallel to the rotating column 63 and includes a roller 69 which is attached to the nozzle 62 and is adapted to roll freely on the guide 68. This is best shown in FIG. 18.

In FIG. 16 there is best shown a control panel 70 which includes the control mechanisms for the drive motors 60 and 65 and control means for the heating unit 61. The compressed air valve for the atomizing or pulverizing nozzle 62 is identified by reference character 71, FIGS. 16–18.

The machine 50 operates in the following manner: the tank connected to the nozzle 62 is filled with the material to be sprayed, for example rubber-base latex, and the drive motors 60 and 65 are started up along with the heating device 61. As a result, the mold frame 53 along with its core 54 will be placed in rotation and the nozzle 62 will assume alternating movement in a direction parallel to the mold to an extent corresponding to the length of the mold. Upon opening the compressed air valve 21, the material contained in the tank connected to the nozzle 62 is sprayed against the mold frame 53, which is rotating inside the housing 55, and the material is deposited upon the mold frame 53 in successive coats. During the rotary motion of the mold, the heating device 61 causes drying and/or vulcanization of the deposited material. When the desired thickness of material is attained on the mold frame 53, the machine 50 is stopped by turning off the nozzle 62, the drive motors 60 and 65 and the heating device 61 and the mold is removed from the housing 55 and the completed girdle, corresponding to that shown in FIGS. 1–3, is removed from the mold. The material which during the spraying process passes through the holes of the screen or perforated plate which makes up the mold frame 53 is deposited in a continuous layer on the core or baffle 54 fastened to the mold frame 53. By replacing the mold on its rotating support 52, another girdle can be manufactured immediately and the foregoing process repeated over and over again.

Referring to FIGS. 19–22, there is illustrated a modification of the machine illustrated in FIGS. 16–18. In the modification of FIGS. 19–22, there is illustrated a machine 50a having a base 72 on which is supported a housing 73 having a long opening 74. Facing the opening 74 is a spray nozzle 75 which is adapted to be supported and guided in the same manner as illustrated and described in connection with spray nozzle 62 in FIGS. 16–18. For that reason the means for supporting and guiding the spray nozzle 75 have not been repeated in FIGS. 19–22. The machine 50a differs from machine 50 in that the carrier for the mold frame 76 and the corresponding core 77 is made of a stationary disc 78 upon which is fastened the core 77. The core 77 is made up of a concave-convex body. Thus it will be seen that the combined mold frame 76 and core 77 corresponds to the mold 20 of FIGS. 7–9.

Figure 20:
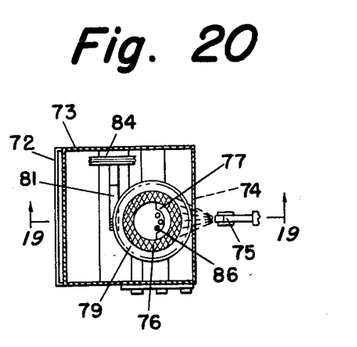
FIG. 20 is a horizontal section taken along the plane 20—20 of FIG. 19.
Figure 21:
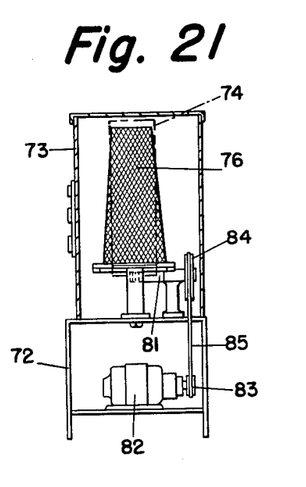
FIG. 21 is a side elevation view in the direction of arrow 21 in FIG. 19 and partially in section.
Figure 22:
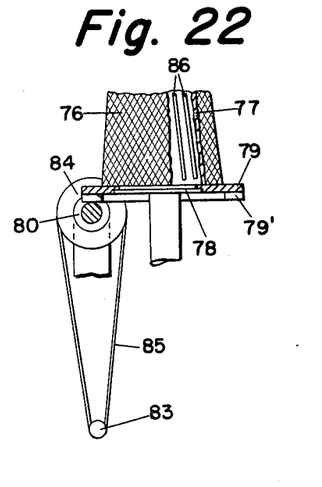
FIG. 22 is an enlarged fractional view of FIG. 19.

As may be seen in FIG. 20, the core 77 is positioned with its convex surface facing the opening 74 of the housing 73 so that it is directly opposite the nozzle 75. The mold frame 76 is attached to and is carried by a rotating gear wheel 79, FIG. 22 concentric with the stationary disc 78. The gear wheel 79, carrying the mold frame 76, is a unit made with a crown gear 79' meshing with a worm wheel 80 on a shaft 81. The shaft 81 is driven from a drive motor 82, FIG. 21, by means of pulleys 83 and 84 and a V-belt 85. A heating device 86 is placed in the concave interior of the core 77 and thus the frame portion 76 of the mold is adapted to rotate relative to both the stationary core 77 and the heating device 86, FIG. 22.

The operation of the machine 50a is similar in many respects to that of machine 50, previously described. The tank connected to the spraying device 75 is filled with the material to be sprayed, such as the rubber-base latex, and the drive motor 82, FIGS. 19–22, and drive motor 65, FIG. 16, are started along with the heating device 86. As a result, the mold frame 76 will be placed in rotation and the nozzle 75 will assume an alternating movement in a direction parallel to the mold frame 76 to an extent corresponding to the length of the mold. Upon opening the compressed air valve, the material contained in the tank connected to the nozzle 75 is sprayed against the mold frame 76, which is rotating inside the housing 73, and the material is deposited upon the mold frame 76 in successive coats. During the rotary motion of the mold frame 76, the heaters 86 dry and/or vulcanize the deposited material and once the desired thickness is obtained, the machine 50a is stopped, the mold frame 76 is removed and the completed girdle removed from it. The material which during the spraying process passes through the holes in the mold frame 76 is deposited in a continuous layer on the convex surface of the core 77. By replacing the mold frame 76 on its rotating support 79, another girdle can be manufactured immediately and the process repeated successively.

Figure 23:
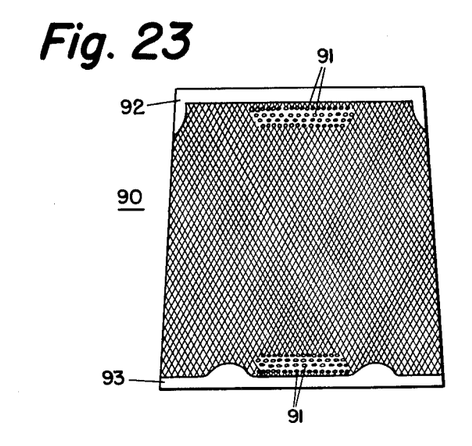
FIG. 23 is a schematic view of a modification of the elastic girdle embodying the present invention.
Figure 24:
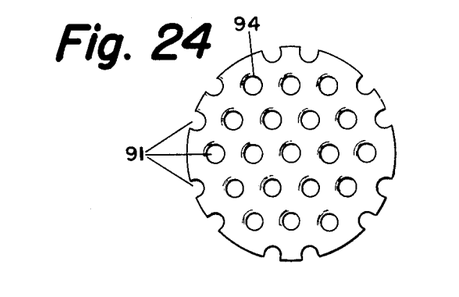
FIG. 24 is a fractional view on enlarged scale of a portion of the girdle of FIG. 1 as viewed from the exterior.

Referring to FIGS. 23–26, there is illustrated another modification of a girdle embodying the present invention. The girdle 90 is made of a single, seamless piece, for example of deposited latex, which on most of its surface contains multiple small molded holes 91 only a few of which have been illustrated in FIG. 23 for purposes of clarity. The multiple small holes 91 extend over the entire surface of the girdle 90 except in the sections which are provided with reinforcing zones. In FIG. 23 there is illustrated upper and lower sections having reinforcing zones 92 and 93 of continuous surface which form a single unit with the area provided with the holes 91. The reinforcements 92 and 93 may be strengthened additionally with cloth or other suitable material.

Figures 25, 26:
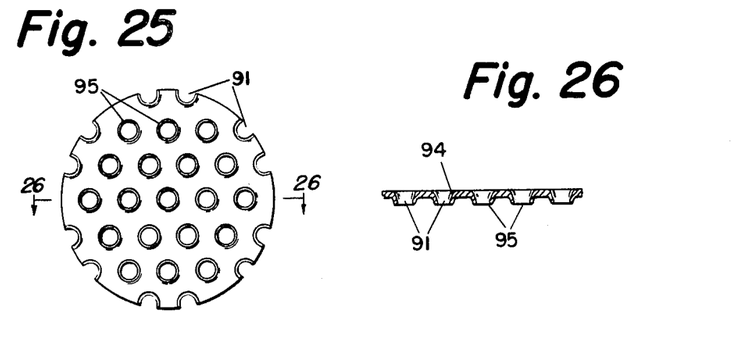
FIG. 25 is a view similar to FIG. 24 as viewed from the inside of the girdle of FIG. 23.
FIG. 26 is a cross-section taken along the plane 26—26 in FIG. 25.

In accordance with the present invention the multiple small holes 91 obtained during the manufacture of the girdle 90 present on the outside of the girdle a rounded edge 94 as may best be seen in FIG. 26. On the inside of the girdle the holes 91 extend in short tubular collars 95 which protrude slightly beyond the general surface of the inner side of the girdle. The girdle 90, because of its many closely-spaced small molded holes, enables the skin to breath and prevents the accumulation of perspiration beneath it when the girdle is worn. The multiple small holes 91 do not cause a harmful weakening in the resistance of the girdle, first because the holes 91 are molded during the process of manufacturing the girdle and secondly because each of the holes has on the reverse side of the girdle a reinforcement composed of the tubular extension 95. The rounded edge 94 presented by the holes 91 on the outside of the girdle cause the outside of the girdle to be quite slippery and thus enable garments to be freely slipped over the girdle. The tubular collar 95 which constitutes a prolongation of the holes 91 to the inside of the girdle causes the inside to be quite non-slippery, the latter being an important characteristic since they prevent the girdle from slipping when placed against the body.

Figure 27:
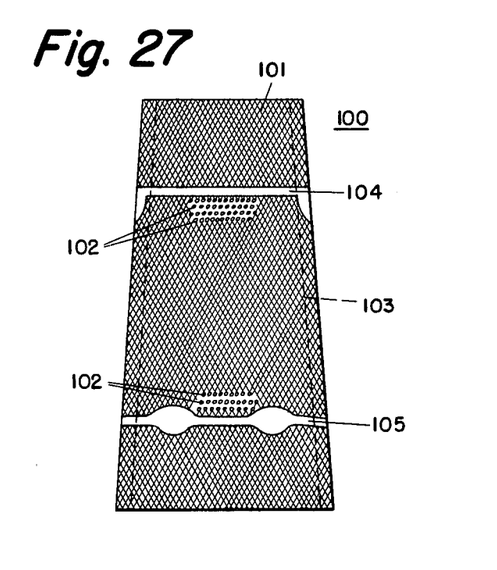
FIG. 27 is a side elevation of a mold embodying the present invention and useful in the manufacture of girdles of the type illustrated in FIG. 23.
Figure 28:
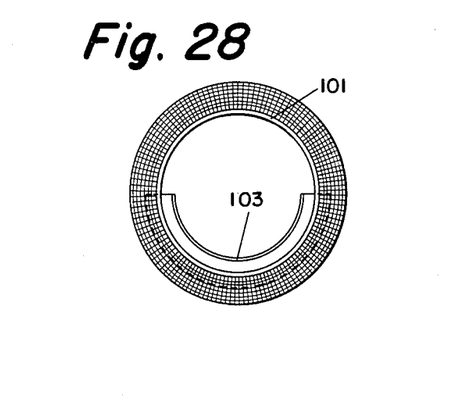
FIG. 28 is a bottom view of FIG. 27.

The girdle 90 illustrated in FIGS. 23–26 may be manufactured on a mold such as illustrated in FIGS. 27 and 28 in conjunction with a machine as described in FIGS. 16–22. Referring to FIGS. 27 and 28, there is illustrated a mold 100 including a body 101 in the form of a hollow truncated cone the wall of which is provided with multiple small holes 102. Only a few of the small holes 102 have been illustrated in FIG. 27 in order not to obscure the drawing, the location of the other small holes being shown schematically by means of crossed lines, such schematic showing also being utilized in FIG. 28. The hollow truncated cone 101 is provided on the inside with a core or baffle 103 of continuous or imperforate surface which is placed at a slight distance from the wall of the cone 101. In the example illustrated in FIGS. 27 and 28, the core 103 comprises a partial hollow truncated cone, but it is to be understood that the core may be a complete body in the shape of a hollow truncated cone such, for example, as previously described in connection with the modifications of molds illustrated in FIGS. 4–15. It is also to be understood that the mold or frame 101 may have other shapes or outlines than a truncated cone, such for example as the other shapes illustrated in FIGS. 13 and 14. Likewise, the frame 101 may be provided with a similar inner frame such for example as in the modification illustrated in FIGS. 10–12. In FIG. 27, the areas 104 and 105 of the frame 101 are covered by a film of any suitable material firmly attached to the outer surface of the frame 101. These areas 104 and 105 provide corresponding continuous imperforate zones on the multiple-hole frame 101 forming flat or raised designs in the completed girdle, such as illustrated at 92 and 93 in FIG. 23.

From the foregoing description it will be seen that elastic seamless girdles embodying the present invention can be produced by spraying latex on relatively inexpensive molds which by reason of their thin open mesh or perforated structure can be readily shaped to provide the desired contour and the girdles can be provided with the desired reinforced areas merely by covering the corresponding perforated areas of the mold so that the latex does not pass through the openings in those areas. The novel machine on which the subject elastic seamless girdles are produced likewise is of relatively inexpensive construction and is easily operated to produce the desired bands or girdles or other molded articles.

It shall be understood that the invention is not limited to the specific arrangements shown, and that changes and modifications may be made within the scope of the appended claims.

What is claimed is:

1. A mold assembly for use in the manufacture of elastic seamless girdles of the spray molded type having a molded network of multiple small holes therethrough to provide a high degree of porosity comprising:

a frame characterized by a hollow rounded body having a thin perforated wall of closed circumference extending around the axis of said body and having the shape desired for the girdle, said wall having distributed throughout the major portion of said body a network of closely spaced multiple small holes therethrough to provide the high degree of porosity in the girdle, the outer surface of said wall being adapted to be coated by a spray of latex, a core mounted inside said body and similar in shape thereto, said core having a continuous imperforate surface of closed circumference corresponding in length with that of said perforated wall of said body and having an area sufficient to intercept the spray of latex passing through said closely spaced holes of said perforated wall of said body and prevent the spray of latex from engaging the inner surface of said perforated wall at the opposite side of said body, and means for supporting said body and said core in spaced relation so that said core is mounted within said body and spaced a slight distance from the inner surface of said perforated wall to provide a void space therebetween.

2. A mold assembly according to claim 1 characterized by a second hollow rounded body corresponding to said first-named hollow rounded body both in shape and construction, said second hollow rounded body being placed over said first-named hollow rounded body and supported in slightly spaced relation thereto for the concurrent manufacture of two elastic seamless girdles.

3. A mold assembly according to claim 1 wherein said perforated wall of said hollow rounded body is characterized by having spaced predetermined areas thereon covered by a film of imperforate material, said film of material being secured to the outer surface of said perforated wall to determine corresponding continuous zones for forming corresponding continuous design areas in the elastic seamless girdles.

4. A mold assembly for use in the manufacture of elastic seamless girdles of the spray molded type having a molded network of multiple small holes therethrough to provide a high degree of porosity comprising:

a frame characterized by a hollow rounded body having a thin perforated wall of closed circumference extending around the axis of said body and having the shape desired for the girdle, said wall having distributed throughout the major portion of said body a network of closely spaced multiple small holes therethrough to provide a high degree of porosity in the girdle, the outer surface of said wall being adapted to be coated by a spray of latex, a core mounted inside said body and characterized by a partial rounded body including a convex surface, said convex surface of said core being imperforate and corresponding in length with that of said perforated wall of said body and having a width sufficient to intercept the spray of latex passing through said closely spaced holes of said perforated wall of said body and prevent the spray of latex from engaging the inner surface of said perforated wall at the opposite side of said body, and means for supporting said body and said core in spaced relation for relative rotation therebetween so that said core is mounted within said body with said convex surface of said core spaced a slight distance from the inner surface of said perforated wall to provide a void space therebetween.

References Cited by the Examiner
UNITED STATES PATENTS

| | | | |
|---|---|---|---|
| 1,791,060 | 2/1931 | Keen | 18—41 |
| 1,881,021 | 10/1932 | Hazell | 18—41 |
| 2,285,502 | 6/1942 | Dreyfus. | |
| 2,801,445 | 8/1956 | Gienger et al. | 18—41 |

J. SPENCER OVERHOLSER, *Primary Examiner.*

MICHAEL V. BRINDISI, WILLIAM J. STEPHENSON,
*Examiners.*